United States Patent
Okada et al.

(10) Patent No.: US 11,252,355 B2
(45) Date of Patent: Feb. 15, 2022

(54) IMAGE PICKUP DEVICE AND ELECTRONIC DEVICE

(71) Applicant: SONY SEMICONDUCTOR SOLUTIONS CORPORATION, Kanagawa (JP)

(72) Inventors: Chihiro Okada, Tokyo (JP); Hung Luong, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/976,362

(22) PCT Filed: Feb. 20, 2019

(86) PCT No.: PCT/JP2019/006222
§ 371 (c)(1),
(2) Date: Aug. 27, 2020

(87) PCT Pub. No.: WO2019/171947
PCT Pub. Date: Sep. 12, 2019

(65) Prior Publication Data
US 2021/0160443 A1 May 27, 2021

(30) Foreign Application Priority Data
Mar. 5, 2018 (JP) .............................. JP2018-038235

(51) Int. Cl.
*H04N 5/361* (2011.01)
*H04N 5/378* (2011.01)
*H04N 5/3745* (2011.01)

(52) U.S. Cl.
CPC ............. *H04N 5/361* (2013.01); *H04N 5/378* (2013.01); *H04N 5/37455* (2013.01)

(58) Field of Classification Search
CPC ..... H04N 5/361; H04N 5/37455; H04N 5/378
See application file for complete search history.

(56) References Cited

U.S. PATENT DOCUMENTS 6,806,901 B1 * 10/2004 Mukherjee ............. H04N 5/367
348/222.1
7,304,679 B1 * 12/2007 Johnson ............... H04N 9/0451
348/333.11

(Continued)

FOREIGN PATENT DOCUMENTS

JP 2008-109264 A 5/2008
JP 2008-219293 A 9/2008

(Continued)

OTHER PUBLICATIONS

International Search Report and Written Opinion of PCT Application No. PCT/JP2019/006222, dated May 7, 2019, 08 pages of ISRWO.

*Primary Examiner* — Lin Ye
*Assistant Examiner* — Chriss S Yoder, III
(74) *Attorney, Agent, or Firm* — Chip Law Group

(57) ABSTRACT

The present technology relates to an image pickup device and an electronic device that enables a reduction in influence exerted by a dark current. The image pickup device and the electronic device include a sample and hold unit configured to perform sampling and holding of a pixel signal, an analog digital (AD) conversion unit configured to perform AD conversion of the pixel signal that includes a digit after a decimal point, a digital gain processing unit configured to apply a predetermined gain to a digital signal from the AD conversion unit, and a gain setting unit configured to set an analog gain of a column unit including the sample and hold unit and the AD conversion unit. The gain setting unit sets the analog gain in accordance with a measured dark current (Continued)

amount. The present technology can be applied, for example, to a CMOS image sensor.

8 Claims, 14 Drawing Sheets

(56) References Cited

U.S. PATENT DOCUMENTS

| | | | | |
|---|---|---|---|---|
| 2002/0176009 | A1* | 11/2002 | Johnson | H04N 5/3575 348/229.1 |
| 2004/0099920 | A1* | 5/2004 | Rossi | H04N 5/361 257/448 |
| 2008/0094489 | A1* | 4/2008 | Takamoto | H04N 5/361 348/241 |
| 2012/0132824 | A1* | 5/2012 | Nishino | H04N 5/32 250/394 |
| 2015/0077598 | A1* | 3/2015 | Luo | H04N 5/361 348/243 |
| 2020/0036921 | A1* | 1/2020 | Funamizu | H04N 5/3745 |

FOREIGN PATENT DOCUMENTS

| | | |
|---|---|---|
| JP | 2009-218682 A | 9/2009 |
| JP | 2012-129983 A | 7/2012 |

* cited by examiner

IMAGE PICKUP DEVICE AND ELECTRONIC DEVICE

CROSS REFERENCE TO RELATED APPLICATIONS

This application is a U.S. National Phase of International Patent Application No. PCT/JP2019/006222 filed on Feb. 20, 2019, which claims priority benefit of Japanese Patent Application No. JP 2018-038235 filed in the Japan Patent Office on Mar. 5, 2018. Each of the above-referenced applications is hereby incorporated herein by reference in its entirety.

TECHNICAL FIELD

The present technology relates to an image pickup device and an electronic device, and for example, relates to an image pickup device and an electronic device that can suppress noise.

BACKGROUND ART

In an electronic device such as a digital still camera or a digital video camera that includes an image capturing function, an image pickup device such as a charge coupled device (CCD) image sensor or a complementary metal oxide semiconductor (CMOS) image sensor, for example, has been conventionally used.

An image pickup device includes a pixel formed by combining a photodiode (PD) that performs photoelectric conversion and a plurality of transistors. An image is formed on the basis of pixel signals output from a plurality of planarly-arranged pixels. In addition, the pixel signals output from the pixels are output after being concurrently AD-converted by a plurality of analog to digital (AD) converters arranged for each column of pixels, for example.

Patent Document 1 proposes clamping a dark current by detecting a dark current amount as a digital value and feeding back the detected value to a digital analog converter (DAC). In addition, Patent Document 2 proposes clamping a dark current by enhancing the accuracy of AD conversion.

CITATION LIST

Patent Document

Patent Document 1: Japanese Patent Application Laid-Open No. 2008-219293
Patent Document 2: Japanese Patent Application Laid-Open No. 2008-109264

SUMMARY OF THE INVENTION

Problems to be Solved by the Invention

It is demanded to more accurately reduce influence exerted by a dark current, without upsizing a circuit scale due to a configuration for reducing the influence exerted by a dark current, and without complicating a circuit configuration.

The present technology has been devised in view of such a situation, and enables a reduction in influence exerted by a dark current.

Solutions to Problems

An image pickup device according to an aspect of the present technology includes a sample and hold unit configured to perform sampling and holding of a pixel signal, an analog digital (AD) conversion unit configured to perform AD conversion of the pixel signal that includes a digit after a decimal point, a digital gain processing unit configured to apply a predetermined gain to a digital signal from the AD conversion unit, and a gain setting unit configured to set an analog gain of a column unit including the sample and hold unit and the AD conversion unit.

An electronic device according to an aspect of the present technology includes an image pickup device, and a signal processing unit configured to process a signal output from the image pickup device, in which the image pickup device includes a sample and hold unit configured to perform sampling and holding of a pixel signal, an analog digital (AD) conversion unit configured to perform AD conversion of the pixel signal that includes a digit after a decimal point, a digital gain processing unit configured to apply a predetermined gain to a digital signal from the AD conversion unit, and a gain setting unit configured to set an analog gain of a column unit including the sample and hold unit and the AD conversion unit.

In the image pickup device according to an aspect of the present technology, sampling and holding of the pixel signal are performed, AD conversion of the pixel signal that includes a digit after a decimal point is performed, the predetermined gain is applied to the digital signal, and an analog gain of the column unit is set.

In the electronic device according to an aspect of the present technology, the image pickup device is included.

Note that an image pickup device may be an independent device or may be an internal block constituting one device.

Effects of the Invention

According to an aspect of the present technology, influence exerted by a dark current can be reduced.

Note that in this connection, the effects described here are not necessarily limited, and may be any of the effects described in the present disclosure.

MODE FOR CARRYING OUT THE INVENTION

Hereinafter, a mode for implementing the present technology (hereinafter referred to as an embodiment) will be described.

<Configuration of Imaging Device>

Because the present technology can be applied to an imaging device, the description will now be given using an example case where the present technology is applied to an imaging device. Note that the description will now be given using an imaging device as an example, but the application of the present technology is not limited to the application to an imaging device. The present technology can be applied to any electronic device that uses an imaging device as an image capturing unit (photoelectric conversion unit). Examples of such an electronic device include an imaging device such as a digital still camera and a video camera, a mobile terminal device including an image capturing function such as a mobile phone, a copying machine that uses an imaging device as an image reading unit, and the like. Note that a modular configuration mounted on an electronic device, that is to say, a camera module is regarded as an imaging device in some cases.

Figure 1:
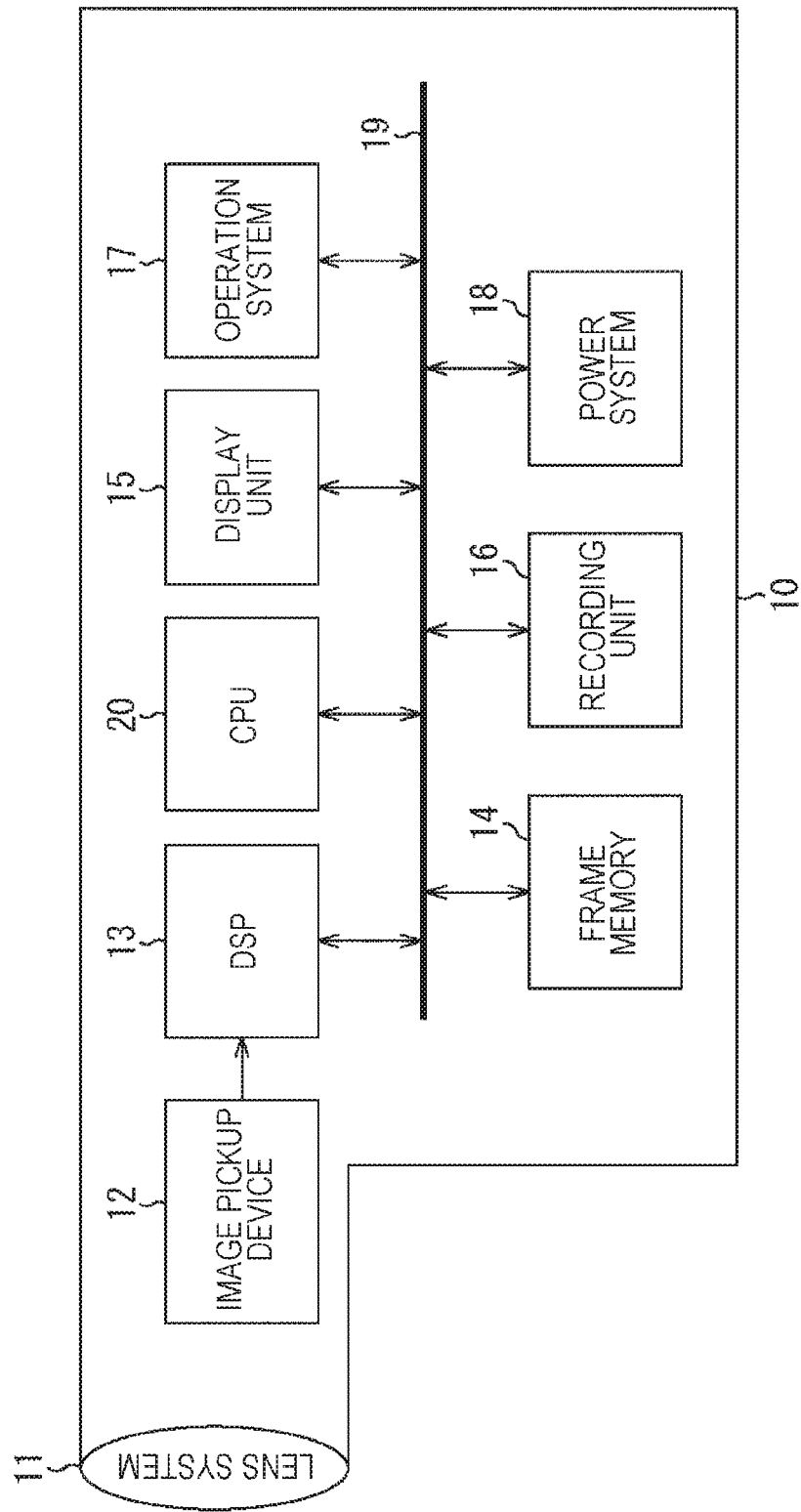
FIG. 1 is a diagram illustrating a configuration example of an imaging device.

FIG. 1 is a block diagram illustrating a configuration example of an imaging device serving as an example of an electronic device according to the present disclosure. As illustrated in FIG. 1, an imaging device 10 includes an optical system including a lens group 11 or the like, an image pickup device 12, a DSP circuit 13 serving as a camera signal processing unit, a frame memory 14, a display unit 15, a recording unit 16, an operation system 17, a power system 18, and the like.

In addition, the DSP circuit 13, the frame memory 14, the display unit 15, the recording unit 16, the operation system 17, and the power system 18 are connected to one another via a bus line 19. A CPU 20 controls each component in the imaging device 10.

The lens group 11 takes in incident light (image light) from a subject and forms an image on an imaging plane of the image pickup device 12. The image pickup device 12 converts a light amount of the incident light formed as the image on the imaging plane by the lens group 11, into an electrical signal for each pixel, and outputs the electrical signal as a pixel signal. An image pickup device (image sensor) including pixels to be described below can be used as the image pickup device 12.

The display unit 15 includes a panel display unit such as a liquid crystal display unit or an organic electro luminescence (EL) display unit, and displays a moving image or a still image that has been captured by the image pickup device 12. The recording unit 16 records a moving image or a still image that has been captured by the image pickup device 12, onto a recording medium such as a video tape or a digital versatile disk (DVD).

In accordance with an operation performed by a user, the operation system 17 issues operation commands for executing various functions included in the imaging device. The power system 18 appropriately supplies the DSP circuit 13, the frame memory 14, the display unit 15, the recording unit 16, and the operation system 17 with various types of power for operating these components.

<Configuration of Image Pickup Device>

Figure 2:
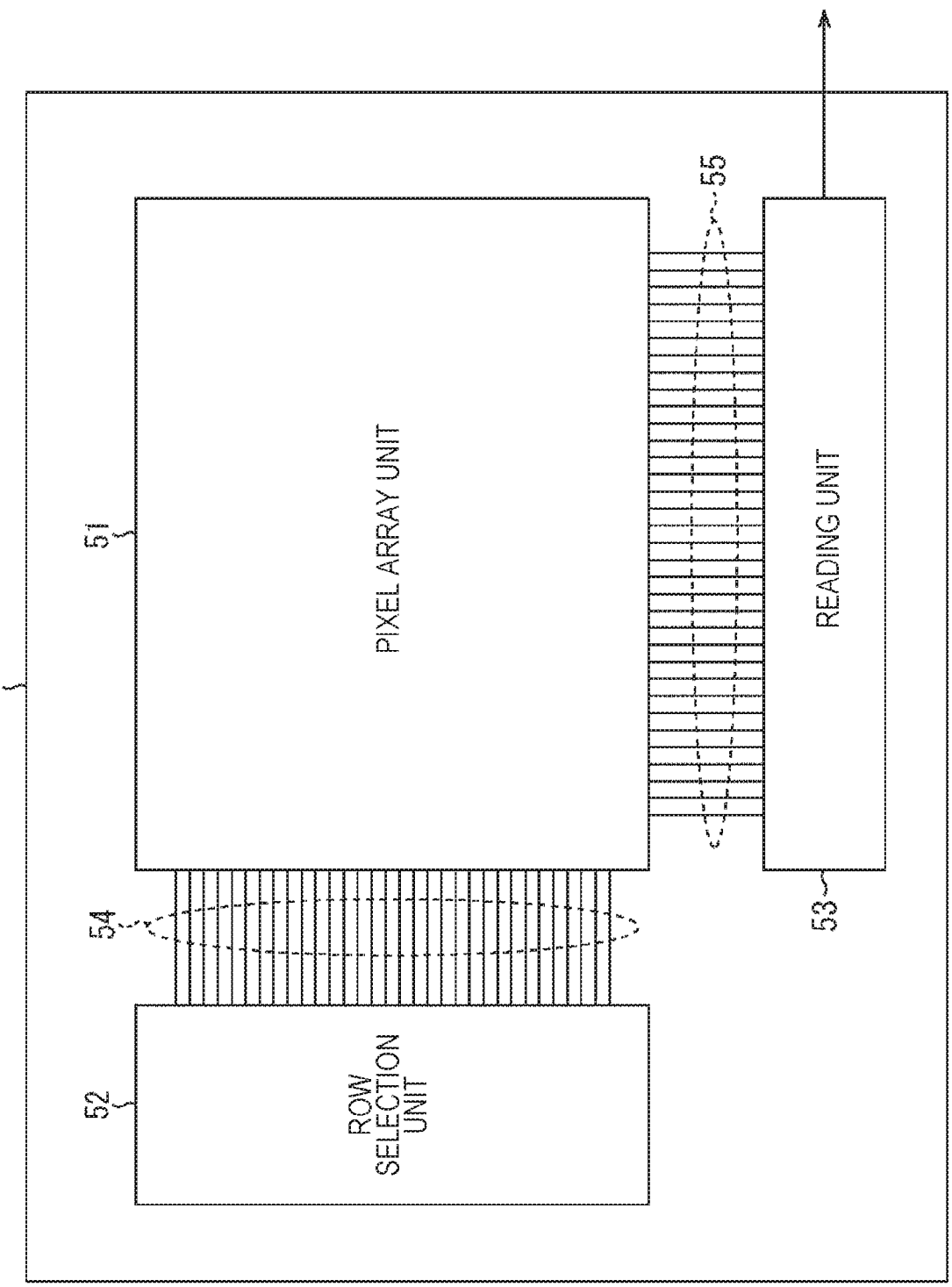
FIG. 2 is a diagram illustrating a configuration example of an image pickup device.

FIG. 2 is a block diagram illustrating a configuration example of the image pickup device 12. A complementary metal oxide semiconductor (CMOS) image sensor can be used as the image pickup device 12. The image pickup device 12 includes a pixel array unit 51, a row selection unit 52 serving as a pixel driving unit, and a reading unit 53.

In the pixel array unit 51, a plurality of pixels 50 (FIG. 3) is two-dimensionally arrayed in an M-by-N matrix including M rows and N columns. Control lines 54 wired to the pixel array unit 51 include a transfer line, a reset line, and a row selection line as one set, and each set is wired to a corresponding one of the rows of the pixel array. M transfer lines, M reset lines, and M row selection lines are provided as control lines. These transfer lines, reset lines, and row selection lines are driven by the row selection unit 52.

The row selection unit 52 controls an operation of pixels arranged on an arbitrary row in the pixel array unit 51. The row selection unit 52 controls a pixel portion through the control lines 54. The reading unit 53 receives data of a pixel row of which readout is controlled by the row selection unit 52, via vertical signal lines 55, and transfers the data to a subsequent signal processing unit. A constant current unit and the reading unit 53 are connected to the vertical signal lines 55.

<Configuration of Pixel>

Figure 3:
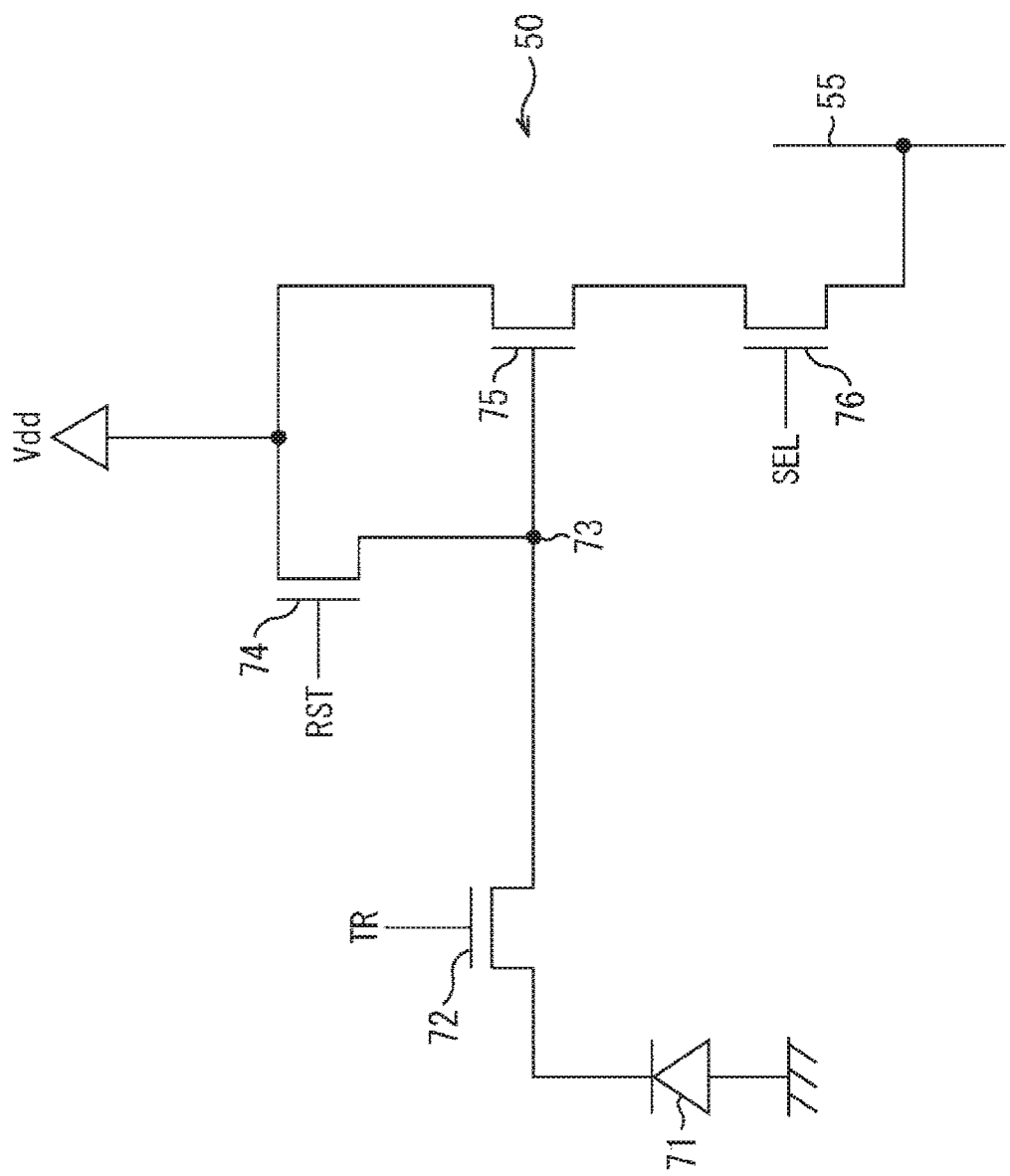
FIG. 3 is a circuit diagram illustrating a pixel.

FIG. 3 is a circuit diagram of the pixel 50 arranged in the pixel array unit 51 (FIG. 2).

The pixel 50 includes a photodiode (PD) 71, a transfer transistor 72, a floating diffusion (FD) 73, a reset transistor 74, an amplification transistor 75, and a selection transistor 76.

The PD 71 functions as a photoelectric conversion element that generates and accumulates electric charges (signal charges) corresponding to a received light amount. An anode terminal of the PD 71 is grounded and a cathode terminal of the PD 71 is connected to the FD 73 via the transfer transistor 72.

When the transfer transistor 72 is turned on in accordance with a transfer signal TR, the transfer transistor 72 reads out the electric charges generated by the PD 71, and transfers the electric charges to the FD 73. The FD 73 holds the electric charges read out from the PD 71. When the reset transistor 74 is turned on in accordance with a reset signal RST, the reset transistor 74 resets an electric potential of the FD 73 by the electric charges accumulated in the FD 73 being discharged to a drain (constant voltage source Vdd).

The amplification transistor 75 outputs a pixel signal corresponding to the electric potential of the FD 73. In other words, the amplification transistor 75 forms a source follower circuit with a load MOS (not illustrated) serving as a constant current source that is connected via the vertical signal line 55. A pixel signal indicating a level corresponding to the electric charges accumulated in the FD 73 is output from the amplification transistor 75 to the reading unit 53 (FIG. 2) via the selection transistor 76 and the vertical signal line 55.

The selection transistor 76 is turned on when the pixel 50 is selected in accordance with a selection signal SEL, and outputs a pixel signal of the pixel 50 to the reading unit 53 via the vertical signal line 55. Signal lines to which the transfer signal TR, the selection signal SEL, and the reset signal RST are transmitted correspond to the control lines 54 illustrated in FIG. 2.

The pixel 50 can have the above-described configuration, but the configuration of the pixel 50 is not limited to this configuration and another configuration can also be employed.

<Configuration of Reading Unit>

Figure 4:
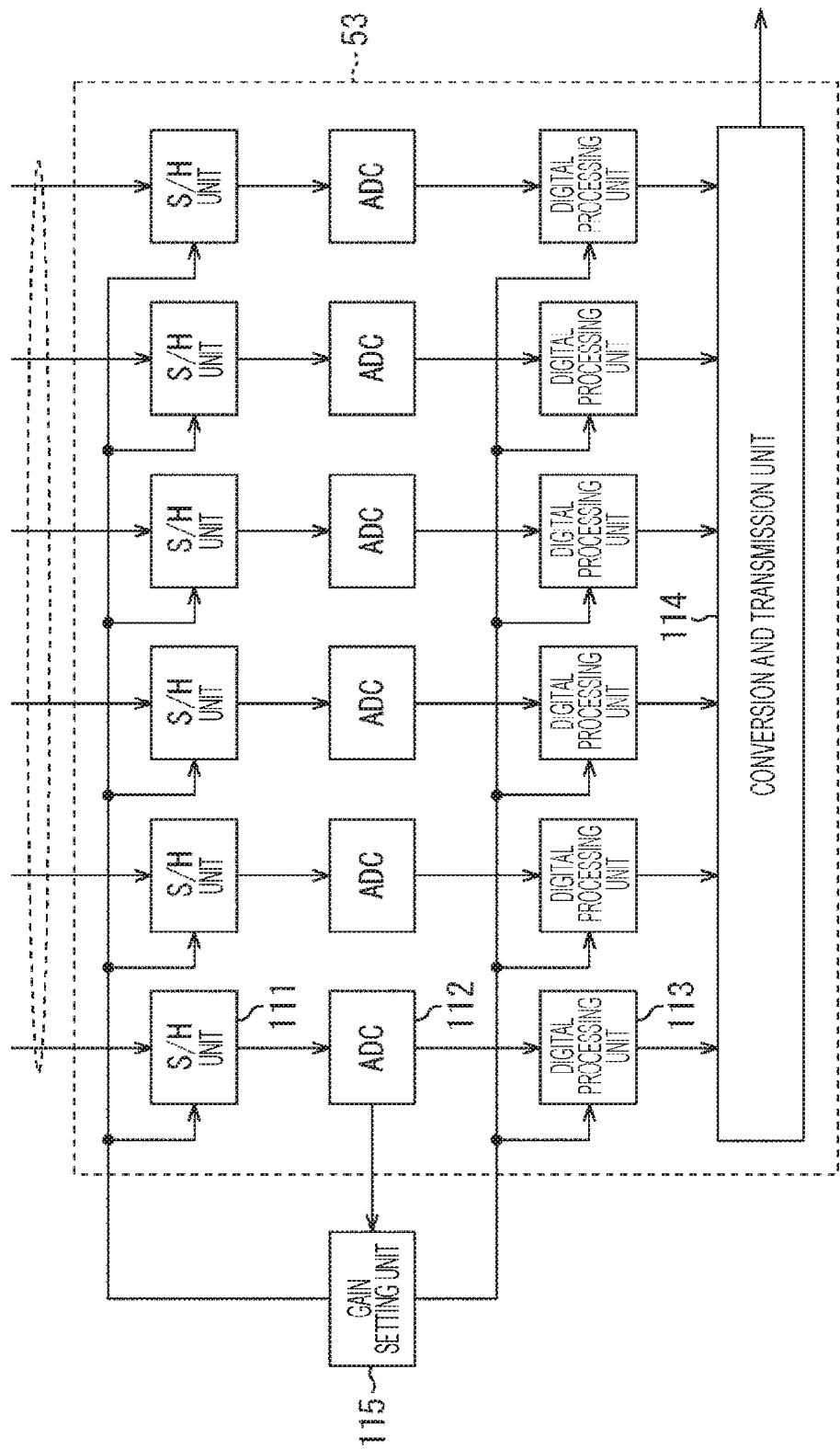
FIG. 4 is a diagram illustrating a configuration example of a reading unit.

FIG. 4 is a diagram illustrating a configuration example of the reading unit 53. The reading unit 53 has a configuration including a sample and hold unit (S/H unit) 111, an analog digital converter (ADC) 112, a digital processing unit 113, and a conversion and transmission unit 114.

The S/H unit 111, the ADC 112, and the digital processing unit 113 are provided for each of the vertical signal lines 55 (FIG. 3). The S/H unit 111 includes a function of sampling a photoelectric conversion amount of the pixel 50 as a sample and holding the photoelectric conversion amount. A signal held by the S/H unit 111 is supplied to the ADC 112. The signal supplied to the ADC 112 is an analog signal, and the ADC 112 converts the supplied analog signal into a digital signal.

The signal converted into the digital signal by the ADC 112 is supplied to the digital processing unit 113. The digital processing unit 113 generates final digital data by further clamping and rounding data converted by the ADC 112 into digital data, and supplies the final digital data to the conversion and transmission unit 114. The conversion and transmission unit 114 includes a function of converting parallel data into serial data and transmitting the converted data to a subsequent signal processing unit (not illustrated). Because pixel values are respectively supplied from a plurality of ADCs 112 to the conversion and transmission unit 114, the conversion and transmission unit 114 converts the plurality of pixel values into serial data and outputs the converted data.

A gain setting unit 115 determines a dark current amount using data from the ADC 112, and sets a gain for suppressing a dark current. The gain setting unit 115 controls the S/H unit 111 and the digital processing unit 113 using the set gain.

First Embodiment

Figure 5:
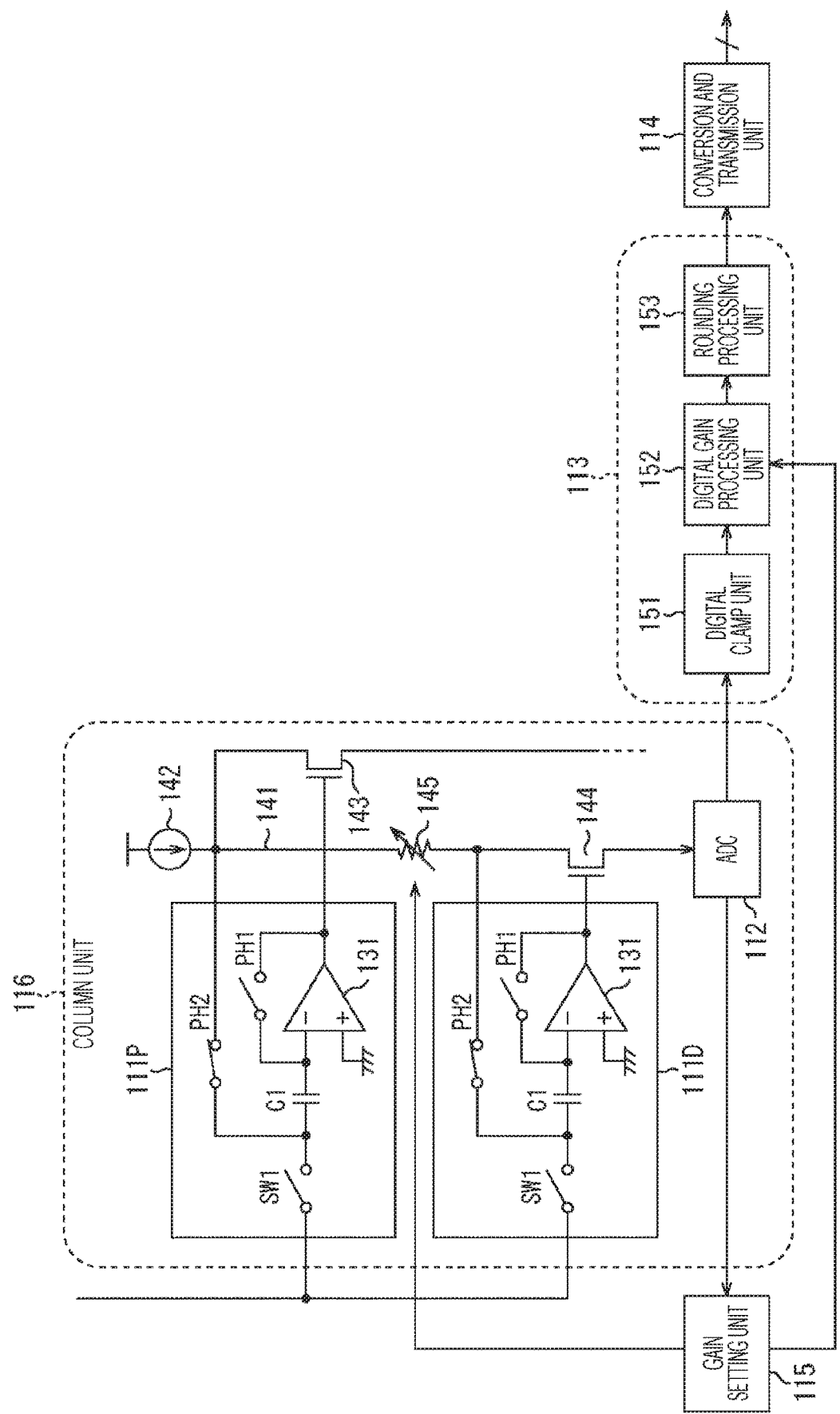
FIG. 5 is a diagram illustrating a configuration example of the reading unit.

FIG. 5 is a diagram illustrating the details of the reading unit 53 illustrated in FIG. 4. Here, the reading unit 53 that expands a circuit range and reduces noise by adjusting a resistance value of variable resistance will be described as the first embodiment.

A part including the S/H unit 111 and the ADC 112 will be referred to as a column unit 116. The column unit 116 includes two S/H units 111. In this example, the two S/H units 111 will be referred to as a S/H unit 111P and a S/H unit 111D. The S/H unit 111P performs sampling and holding in readout of a P-phase, and the S/H unit 111D performs sampling and holding in readout of a D-phase. In addition, here, the readout of the P-phase means the readout of a pixel reset signal, and the readout of the D-phase means the readout of a pixel data signal.

Because the S/H unit 111P and the S/H unit 111D have similar configurations, in a case where there is no need to make a distinction between the S/H unit 111P and the S/H unit 111D, the S/H unit 111P and the S/H unit 111D will be simply described as the S/H unit 111.

The S/H unit 111 has a configuration including an operational amplifier 131, a switch SW1, a switch PH1, a switch PH2, and a capacitor C1. A S/H circuit includes the capacitor C1 having one end connected to an inverting input terminal IN ("-" in the drawing) of the operational amplifier 131.

The electric potential of one end of the capacitor C1 can be set to an electric potential V of an output terminal Vout of the operational amplifier 131 by turning on (closing) the switch PH1. When the switch SW1 is turned on in a state in which the switch PH1 is turned, and another end of the capacitor C1 is connected to an input terminal VIN ("Vpix" in the drawing) of a sampling voltage, electric charges corresponding to an input electric potential to Vin are charged in the capacitor C1.

When the switch PH1 and the switch SW1 are turned off at a sampling time ts, the capacitor C1 holds the charged electric charges, and the electric potential of the other end of the capacitor C1 is held at an input electric potential VH at the time ts. The electric potential VH of the other end of the capacitor C1 is taken out as an output value of the output Vout by turning on the switch PH2.

One end of the switch PH2 of the S/H unit 111P is connected to a signal line 141 and a source of a transistor 143. An output end of the operational amplifier 131 of the S/H unit 111P is connected to a gate of the transistor 143.

One end of the switch PH2 of the S/H unit 111D is connected to the signal line 141 and a source of a transistor 144. An output end of the operational amplifier 131 of the S/H unit 111D is connected to a gate of the transistor 144.

A current source 142 is connected to one end of the signal line 141 and a current with a constant current value flows in the signal line 141. The ADC 112 is connected to another end of the signal line 141, and the ADC 112 converts a current that has flowed to the ADC 112 via the signal line 141, into a digital value. The ADC 112 is a current input type analog digital converter.

A variable resistance 145 is connected to the middle of the signal line 141. The variable resistance 145 is provided between a point to which an output of the S/H unit 111P is connected, and a point to which an output of the S/H unit 111D is connected. The variable resistance 145 functions as an analog gain in the column unit 116.

A current corresponding to a difference between a voltage value held by the S/H unit 111P and a voltage value held by the S/H unit 111D flows in the signal line 141. The voltage value held by the S/H unit 111P corresponds to a pixel signal of a reset level, and the voltage value held by the S/H unit 111D corresponds to a pixel signal of a signal level. Thus, the difference between the voltage value held by the S/H unit 111P and the voltage value held by the S/H unit 111D becomes a value obtainable when the pixel signal of the reset level is subtracted from the pixel signal of the signal level, and becomes a pixel value from which reset noise has been removed.

The ADC 112 converts such a pixel value into digital data, and supplies the converted data to the digital processing unit 113 and the gain setting unit 115. In this manner, the column unit 116 acquires a pixel value from which reset noise has been removed, on the basis of the pixel signals respectively held by the S/H unit 111P and the S/H unit 111D, converts the pixel value into a digital signal by the ADC 112, and supplies the digital signal to the digital processing unit 113 and the gain setting unit 115.

The digital processing unit 113 has a configuration including a digital clamp unit 151, a digital gain processing unit 152, and a rounding processing unit 153. The digital clamp unit 151 clamps a digital signal from the ADC 112, and supplies the digital signal to the digital gain processing unit 152.

The digital gain processing unit 152 applies a gain to a digital signal using a gain set by the gain setting unit 115, and supplies the resultant digital signal to the rounding processing unit 153. The rounding processing unit 153 executes rounding processing. The ADC 112 performs AD conversion including digits after the decimal point, and the rounding processing unit 153 performs processing of rounding a value to an integer value. An output from the digital processing unit 113 is supplied to the conversion and transmission unit 114, converted into serial data together with other types of data, and supplied to a subsequent processing unit (not illustrated).

Among outputs from the ADC 112, an output at dark current detection is supplied to the gain setting unit 115. The description about dark current detection will be added. The dark current detection is performed using a pixel value of a predetermined line of the pixel array unit 51 as illustrated in FIG. 6.

Figure 6:
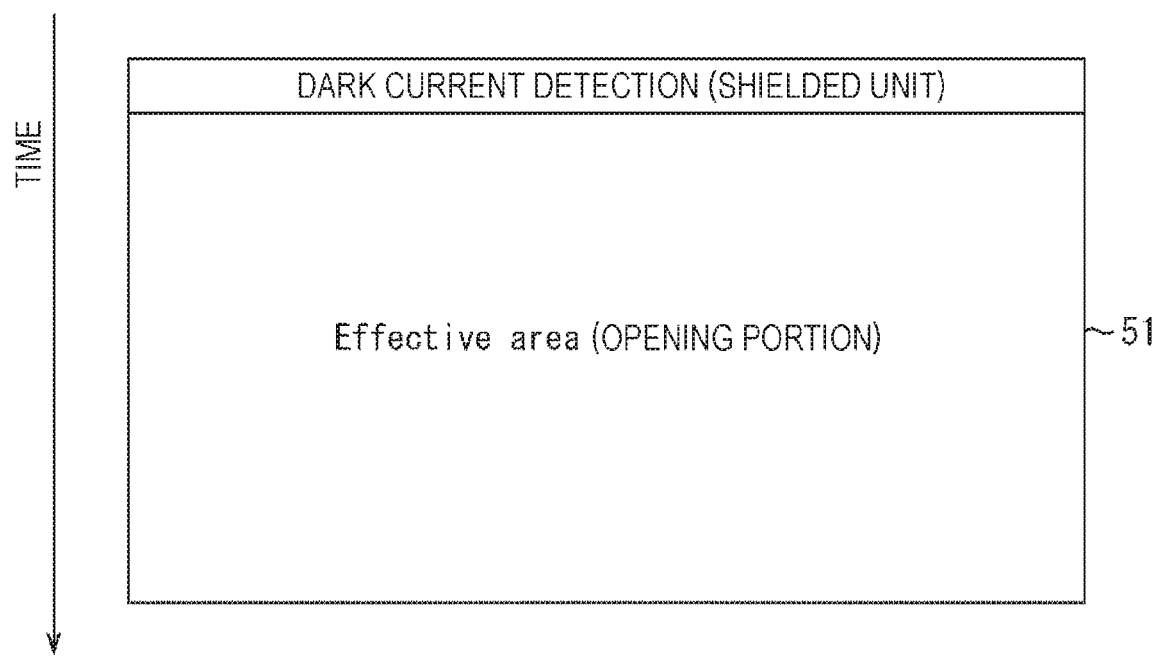
FIG. 6 is a diagram for describing a pixel array of a pixel array unit.

Referring to FIG. 6, the pixels 50 are arranged in an array in the pixel array unit 51. In the pixel array unit 51, a plurality of pixels is arranged on one line, and a plurality of lines each including a plurality of pixels arranged in this manner is provided. A predetermined line of the pixel array unit 51 such as a first line positioned on the top in FIG. 6, that is to say, a line that is to be initially read out in the readout is shielded and is configured not to receive light. A dark current is detected using pixel values corresponding to the one line, and a gain corresponding to the dark current is set by the gain setting unit 115.

Note that the description will now be given of an example case where processing is performed using pixel values corresponding to one line, but processing can also be performed using pixel values corresponding to two or more lines, for example.

In addition, the description will now be continued using an example in which processing is performed using the top one line of the pixel array unit 51 as illustrated in FIG. 6, but the position of this line is not limited to the top one line, and a bottom one line may be used. In addition, for example, in a case where a dark current is detected using two lines, shielded lines may be used as the top one line and the bottom one line of the pixel array unit 51, for example, and processing may be performed using the two lines.

The description will return to the description of the configuration of the reading unit 53 that is illustrated in FIG. 5. In the column unit 116, an output from the column unit 116 that is obtained when a signal from the pixel 50 arranged on a line of a pixel array unit 22 that is provided for dark current detection is processed is supplied to the gain setting unit 115. The gain setting unit 115 detects a dark current, and sets a gain in the column unit 116 and a gain of the digital gain processing unit 152 in the digital processing unit 113 in accordance with a dark current amount.

In the reading unit 53 according to the first embodiment that is illustrated in FIG. 5, a case where a gain in the column unit 116 that is set by the gain setting unit 115 is a resistance value of the variable resistance 145 is illustrated. In a case where the gain setting unit 115 decreases a gain in the column unit 116, for example, the gain setting unit 115 increases a gain of the digital gain processing unit 152. The gain of the column unit 116 and the gain of the digital gain processing unit 152 are set in such a manner that a constant value is obtained when one gain is multiplied by the other gain, for example. In other words, the gains are set in such a manner that, when one gain is decreased, the other gain is increased.

By performing such a setting of gains, a gain in the reading unit 53 can be set to a constant value, and processing can be performed using the gain with the constant value. The first embodiment corresponds to a case where a resistance value of the variable resistance 145 is adjusted for adjusting a gain of the column unit 116. In a case where the gain of the column unit 116 is to be decreased, the resistance value of the variable resistance 145 is set to a higher value. In a case where the gain of the column unit 116 is to be increased, the resistance value of the variable resistance 145 is set to a lower value.

Figure 7:
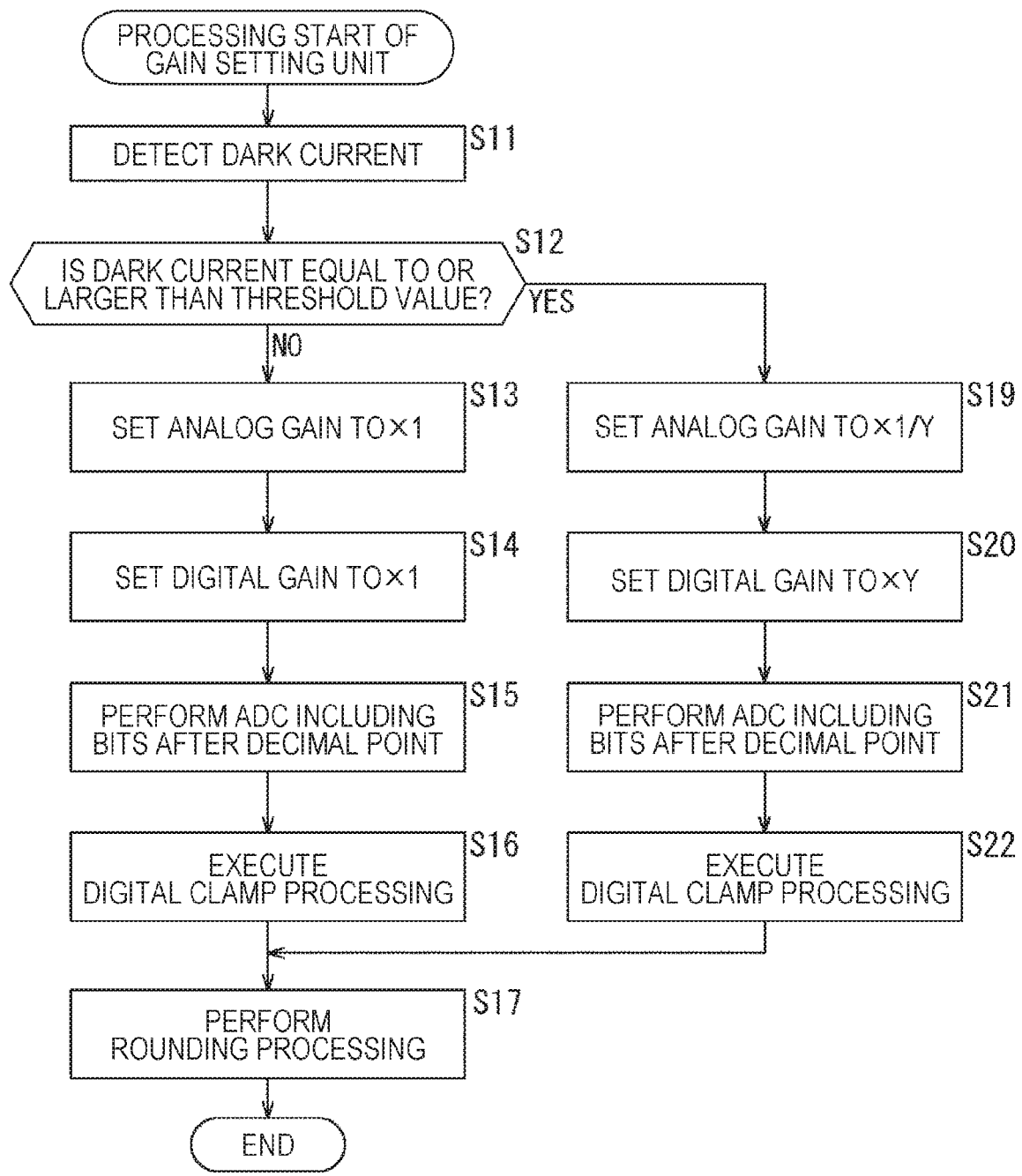
FIG. 7 is a flowchart for describing an operation of the reading unit.

Processing of the reading unit 53 illustrated in FIG. 5 will be described with reference to a flowchart illustrated in FIG. 7.

In step S11, a dark current is detected. As described above with reference to FIG. 6, by processing an output from a pixel on a shielded line of the pixel array unit 51, a dark current is detected. Because a dark current depends on a usage environment and can possibly fluctuate in accordance with a heat change, for example, a dark current is detected at predetermined intervals or at a predetermined timing such as every time image capturing is performed or a time when power is turned on.

In step S12, it is determined whether or not the dark current is equal to or larger than a threshold value. A pixel value read out from the shielded pixel 50 essentially becomes zero, but the pixel value does not become zero due to various factors. A current detected in a state in which a pixel value essentially becomes zero is referred to as a dark current.

When a pixel value read out from a shielded line and supplied from the ADC 112 is input, that is to say, a digital signal indicating a dark current in this case is input, the gain setting unit 115 determines whether or not the dark current indicated by the digital signal is equal to or larger than a threshold value.

In a case where it is determined in step S12 that the dark current is not equal to or larger than the threshold value, the processing proceeds to step S13. In step S13, the gain setting unit 115 sets a gain of the column unit 116 to "×1". In this case, an analog gain of the column unit 116 is adjusted to "×1" by adjusting a resistance value of the variable resistance 145.

When an analog gain of the column unit 116 is set in this manner, in step S14, a digital gain is set to "×1" as a digital gain corresponding to the analog gain. In other words, the gain setting unit 115 sets a gain of the digital gain processing unit 152 to "×1".

When a gain of the column unit 116 and a gain of the digital gain processing unit 152 are set in this manner, image capturing processing using the set gains is performed. Referring again to the pixel array unit 51 illustrated in FIG. 6, lines excluding the top one line of the pixel array unit 51 are regarded as an opening portion and are configured to receive light. Processing of acquiring pixel values from the pixels 50 arranged in this opening portion is performed.

In step S15, the ADC 112 executes processing of converting a signal obtained from the pixel 50. In other words, the ADC 112 executes processing of converting a current value being an analog signal of a current flowing in the signal line 141, into a current value of a digital signal. In this manner, the ADC 112 is a current input type analog digital converter. In addition, the ADC 112 converts an analog signal into a digital signal including digits after the decimal point. For example, an analog signal is converted into a digital signal including 2 bits after the decimal point.

An output from the ADC 112 is subjected to multiplication processing of a digital gain that is performed by the digital gain processing unit 152 provided subsequent to the ADC 112. For suppressing a deterioration in image information that is caused by the digital gain, the ADC 112 preliminarily converts an analog signal into a digital signal including bits after the decimal point with low accuracy, and uses the converted signal as random numbers.

For example, in a case where a digital gain is set to "×2", carry-up occurs, and if digital data from the ADC 112 has the accuracy up to an integer value, data in the lower first digit becomes meaningless data. In other words, by multiplying a digital gain, image information can possibly deteriorate.

Nevertheless, if digital data from the ADC 112 includes data including a numerical value after the decimal point, the numerical value after the decimal point is carried up, and data in the first digit after an integer part can be made into meaningful data. Thus, even if a digital gain is multiplied, a deterioration in image information can be prevented.

The description will now be continued using an example case where the ADC 112 converts an analog signal into a digital signal including bits after the decimal point, and the number of bits after the decimal point is two, but the number of bits after the decimal point may be the number of bits other than two.

In step S16, the digital clamp unit 151 performs digital clamp processing on the digital signal including 2 bits after the decimal point that has been supplied from the ADC 112, and supplies the resultant digital signal to the digital gain processing unit 152. Because a gain of the digital gain processing unit 152 is set to "×1" in the above-described processing, the digital gain processing unit 152 executes processing of dividing the supplied digital signal by the gain of "×1", and supplies the resultant digital signal to the rounding processing unit 153.

The processing described so far is performed using data including 2 bits after the decimal point. Then, in step S17, data is converted into an integer value by the rounding processing unit 153 rounding out or rounding down the data including 2 bits after the decimal point.

On the other hand, in a case where it is determined in step S12 that the dark current is equal to or larger than the threshold value, in processing in step S19 and subsequent steps, the resetting of a user gain is performed. The user gain is a gain obtained by multiplying a gain of the column unit 116 by a gain of the digital processing unit 113. The user gain is set to be a constant gain. That is to say, the user gain is set to be 1.

In step S19, the gain setting unit 115 sets an analog gain of the column unit 116 to "×(1/Y)". In this case, an analog gain of the column unit 116 is adjusted to an analog gain of "×(1/Y)" by adjusting a resistance value of the variable resistance 145. The gain (1/Y) can be set to a value corresponding to the magnitude of a dark current. That is to say, as a value of (1/Y), a plurality of values can be set instead of presetting one value, and a value corresponding to the magnitude of a dark current can be set.

When an analog gain of the column unit 116 is set in this manner, in step S20, a digital gain is set to "×Y" as a digital gain corresponding to the analog gain. In other words, the gain setting unit 115 sets a gain of the digital gain processing unit 152 to "×Y". In this case, because an analog gain is "1/Y" and a digital gain is "Y", a value obtained by multiplying the analog gain by the digital gain becomes 1 (=(1/Y)×Y).

When an analog gain of the column unit 116 and a digital gain of the digital gain processing unit 152 are set in this manner, image capturing processing using the set gains is performed. Because processing in step S22 and a subsequent step is performed basically similarly to the processing in step S15 and subsequent steps, the description thereof will be omitted here.

In this manner, a user gain (=analog gain×digital gain) is set in accordance with the magnitude of a dark current and image capturing with a suppressed dark current can be performed using the set user gain. In addition, generally, if an analog gain is changed by decreasing the analog gain, for example, a noise characteristic can possibly deteriorate. Nevertheless, by applying such circuit noise to a region dominated by a dark current, the circuit noise can be processed by burying the circuit noise into noise attributed to the dark current.

In addition, for preventing a deterioration in image information that is caused by a digital gain, the ADC 112 preliminarily converts analog data into digital data including bits after the decimal point with low accuracy, and the converted data is used as random numbers. Thus, deterioration in image information that is caused by a digital gain can be prevented.

Second Embodiment

Figure 8:
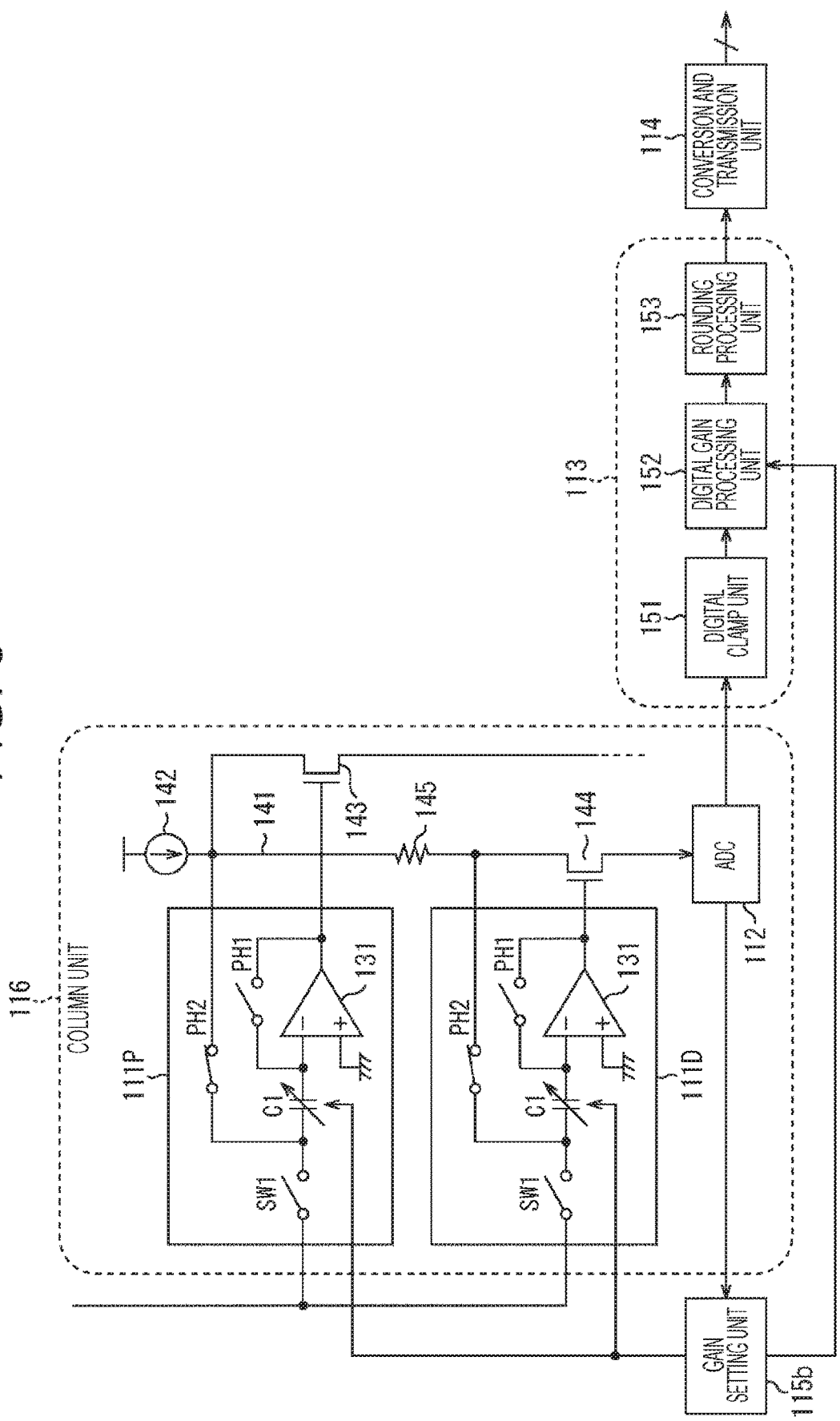
FIG. 8 is a diagram illustrating a configuration example of the reading unit.

Next, a reading unit 53 according to the second embodiment will be described. FIG. 8 is a diagram illustrating a configuration example of the reading unit 53 according to the second embodiment. In the second embodiment, the reading unit 53 that expands a circuit range and reduces noise by adjusting the capacitance of a capacitor will be described.

The configuration of the reading unit 53 (hereinafter, will be referred to as a reading unit 53b) illustrated in FIG. 8 is a configuration similar to the configuration of the reading unit 53 (hereinafter, will be referred to as a the reading unit 53a) according to the first embodiment that is illustrated in FIG. 5, but differs from the reading unit 53a in a part controlled by the gain setting unit 115. Because the other parts are similar, the description of similar parts will be omitted.

A gain setting unit 115b of the reading unit 53b illustrated in FIG. 8 adjusts an analog gain of the column unit 116 by adjusting capacitance values of the capacitor C1 included in the S/H unit 111P in the column unit 116, and the capacitor C1 included in the S/H unit 111D in the column unit 116. Because capacitance values of the capacitor C1 included in the S/H unit 111P and the capacitor C1 included in the S/H unit 111D are adjusted, the capacitors C1 are variable capacitance type capacitors.

In a case where the gain setting unit 115b changes an analog gain in such a manner that a user gain becomes a constant value, similarly to the first embodiment, the gain setting unit 115b changes a digital gain. The gain setting unit 115b also sets a gain of the digital gain processing unit 152 of the digital processing unit 113.

Because a resistance value of a resistance 145 of the column unit 116 is not changed unlike the first embodiment, the resistance 145 is a resistance having a fixed resistance value.

Here, in a case where an amount of electric charges that can be accumulated in the capacitor C1 is denoted by Q, a capacitance of the capacitor C1 is denoted by C, and a voltage applied to the capacitor C1 is denoted by V, a relational expression represented as Q=CV is satisfied. In a case where electric charges with the same amount are to be accumulated (the electric charge amount Q is set to a constant value), in a case where the capacitance C is changed to a larger value, the voltage V becomes a smaller value. Thus, an output voltage from the S/H unit 111 also becomes a smaller value. In this manner, by adjusting the capacitance C of the capacitor C1, an output voltage from the S/H unit 111 can be changed, and a gain in the column unit 116 can be adjusted.

In this manner, by adjusting the capacitance of the capacitor C1 in the S/H unit 111, a circuit range can be expanded and noise caused by a dark current or the like can be reduced. An operation of the reading unit 53b according to the second embodiment is an operation basically similar to that of the reading unit 53a according to the first embodiment, and is performed on the basis of the processing in the flowchart illustrated in FIG. 7 flowchart. Thus, the description thereof will be omitted here.

Nevertheless, the setting of an analog gain is set to a capacitance value of the capacitor C1 that realizes an analog gain desired to be set, and a digital gain corresponding to the analog gain is set in the digital gain processing unit 152.

Also in the reading unit 53b in the second embodiment, a user gain (=analog gain×digital gain) is set in accordance with the magnitude of a dark current and image capturing with a suppressed dark current can be performed using the set user gain. In addition, if an analog gain is changed, for example, a noise characteristic can possibly deteriorate. Nevertheless, by applying such circuit noise to a region dominated by a dark current, the circuit noise can be processed by burying the circuit noise into noise attributed to the dark current.

In addition, for preventing a deterioration in image information that is caused by a digital gain, the ADC 112 preliminarily converts analog data into digital data including bits after the decimal point with low accuracy, and the converted data is used as random numbers. Thus, deterioration in image information that is caused by a digital gain can be prevented.

Third Embodiment

Figure 9:
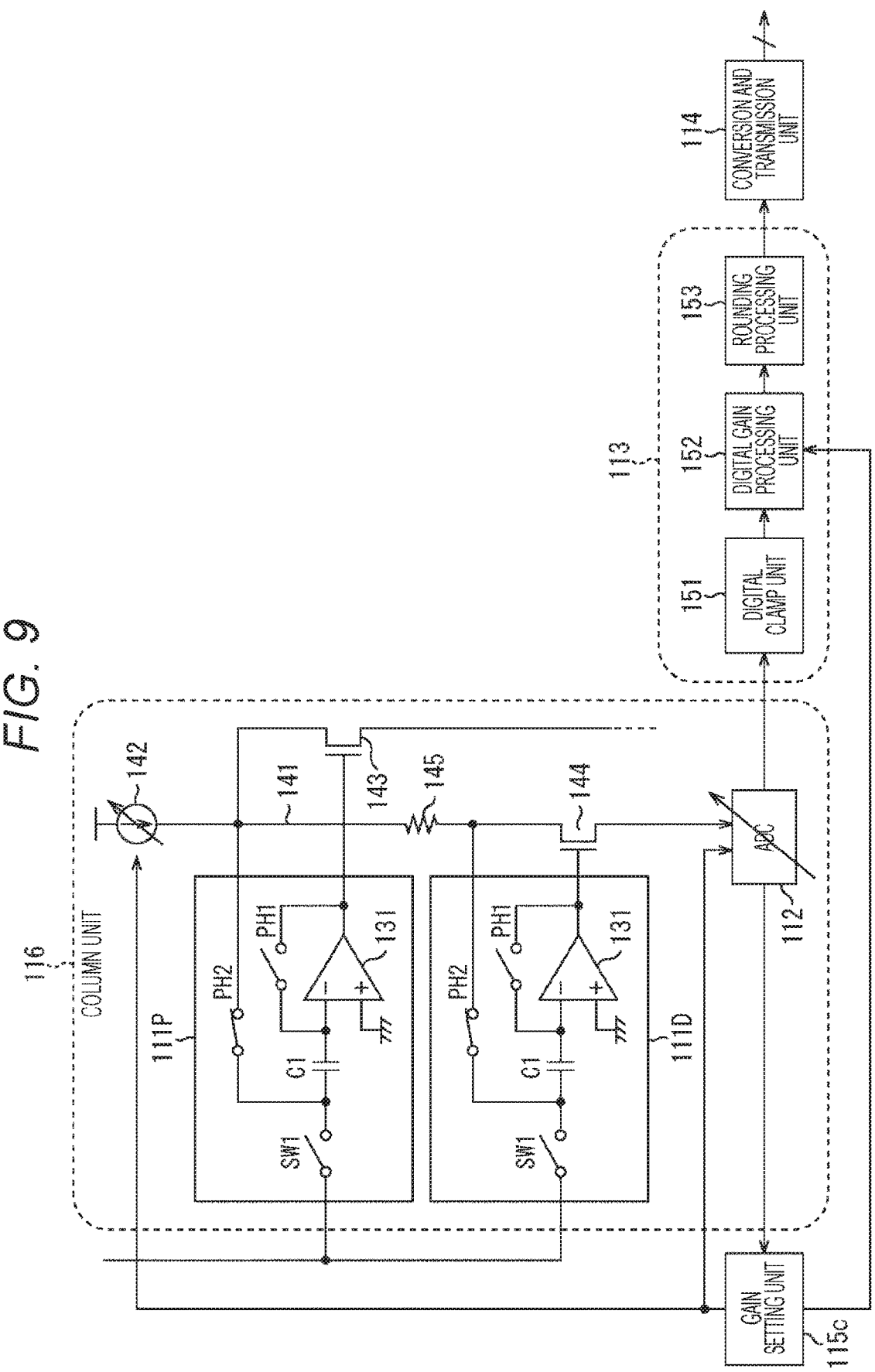
FIG. 9 is a diagram illustrating a configuration example of the reading unit.

Next, a reading unit 53 according to the third embodiment will be described. FIG. 9 is a diagram illustrating a configuration example of the reading unit 53 according to the third embodiment. In the third embodiment, the reading unit 53 that expands a circuit range and reduces noise by adjusting a current that flows in the signal line 141 will be described.

The configuration of the reading unit 53 (hereinafter, will be referred to as a reading unit 53c) illustrated in FIG. 9 is a configuration similar to the configuration of the reading unit 53 according to the first embodiment that is illustrated in FIG. 5, but differs from the reading unit 53a in a part controlled by the gain setting unit 115. Because the other parts are similar, the description of similar parts will be omitted.

A gain setting unit 115c of the reading unit 53c illustrated in FIG. 9 adjusts an analog gain of the column unit 116 by adjusting the magnitude of a current flowed by a current source 112 in the column unit 116 and the magnitude of a current in the ADC 112. Because the magnitude of a current flowed by the current source 112 in the column unit 116 is adjusted, the current source 112 is a variable current type current source.

Note that the current source 112 in the first and second embodiments is a constant current source that flows a constant current. Because a resistance value of a resistance 145 of the column unit 116 is not changed unlike the first embodiment, the resistance 145 is a resistance having a fixed resistance value.

In a case where the gain setting unit 115c changes an analog gain in such a manner that a user gain becomes a constant value, similarly to the first embodiment, the gain setting unit 115c changes a digital gain. The gain setting unit 115c also sets a gain of the digital gain processing unit 152 of the digital processing unit 113.

In a case where the magnitude of a current flowed by the current source 142 is a current value A, the ADC 112 measures the magnitude of an input current at a scale set in a case where the magnitude is the current value A. A case where the ADC 112 performs AD conversion of the same pixel value (will be referred to as a pixel value B) will be assumed.

In a case where the magnitude of a current flowed by the current source 142 is the current value A, the ADC 112 measures the magnitude of an input current at a scale set in a case where the magnitude is the current value A, and outputs the pixel value B as a result. For example, when the current of the current source 142 is changed, if AD conversion is performed without changing the scale of the ADC 112, a value of the pixel value B can possibly become a wrong value.

Thus, in a case where a current value of the current source 142 is changed, a scale of the ADC 112 needs to be changed to a scale corresponding to the changed current value. For example, in a case where a double gain is desired to be obtained, a scale of the ADC 112 is halved (×½) with the current of the current source 142 remaining unchanged (×1). In addition, for example, in a case where the scale of the ADC 112 is doubled, because a ½ gain is applied, the current of the current source 142 is doubled. In this manner, a current value of the current source 142 and the size of a scale of the ADC 112 are adjusted in such a manner that a desired gain is to be obtained.

In a case where the ADC 112 is configured to perform AD conversion in accordance with an input current value and an output from a digital analog converter (DAC), the scale of the ADC 112 can be adjusted by changing a current value of the DAC. For example, in a case where a current value of the ADC 112 is changed to a smaller value (a current value of the DAC in the ADC 112 is changed to a smaller value), an ADC result becomes larger. By utilizing such a relationship, a scale of the ADC 112 can be adjusted.

In this manner, by adjusting a current value of the current source 142 and a scale of the ADC 112, a circuit range can be expanded and noise caused by a dark current or the like can be reduced. An operation of the reading unit 53c according to the third embodiment is an operation basically similar to that of the reading unit 53a according to the first embodiment, and is performed on the basis of the processing in the flowchart illustrated in FIG. 7 flowchart. Thus, the description thereof will be omitted here.

Nevertheless, the setting of an analog gain is set to a combination of the current value of the current source 142 and the scale of the ADC 112 that realize an analog gain desired to be set, and a digital gain corresponding to the analog gain is set in the digital gain processing unit 152.

Also in the reading unit 53c in the third embodiment, a user gain (=analog gain×digital gain) is set in accordance with the magnitude of a dark current and image capturing with a suppressed dark current can be performed using the set user gain. In addition, if an analog gain is changed, for example, a noise characteristic can possibly deteriorate. Nevertheless, by applying such circuit noise to a region dominated by a dark current, the circuit noise can be processed by burying the circuit noise into noise attributed to the dark current.

In addition, for preventing a deterioration in image information that is caused by a digital gain, the ADC 112 preliminarily converts analog data into digital data including bits after the decimal point with low accuracy, and the converted data is used as random numbers. Thus, deterioration in image information that is caused by a digital gain can be prevented.

In the above-described embodiments, the description has been given of an example case where the gain setting unit 115 suppresses a dark current by setting a resistance value, a capacitance value, or a current value. As described above, these embodiments can be individually implemented, or these embodiments can also be implemented in combination. For example, the gain setting unit 115 may set a resistance value and a capacitance value, and suppress a dark current using a combination of the resistance value and the capacitance value.

<Configuration Example of Laminated Imaging Device to which Technology According to Present Disclosure can be Applied>

Figure 10A:
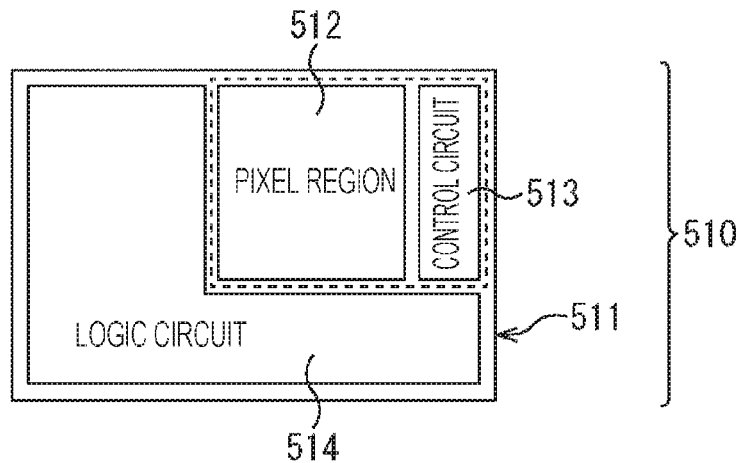
FIGS. 10A, 10B, and 10C is a are diagrams illustrating an overview of a configuration example of a stacked solid-state imaging device.
Figure 10B:
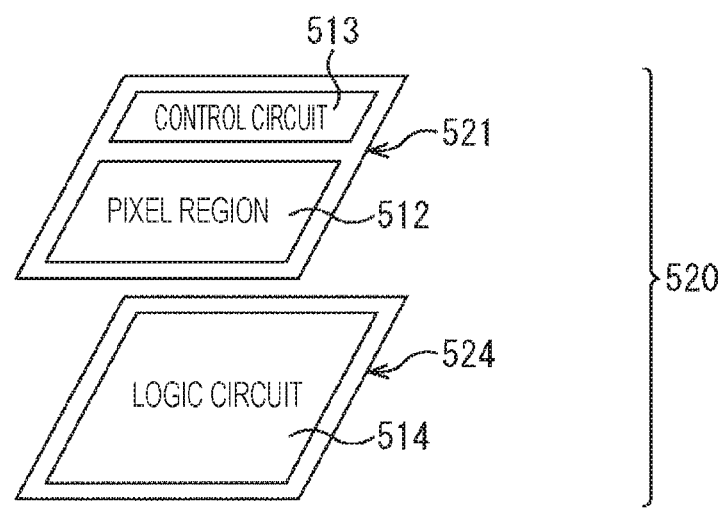
Figure 10C:
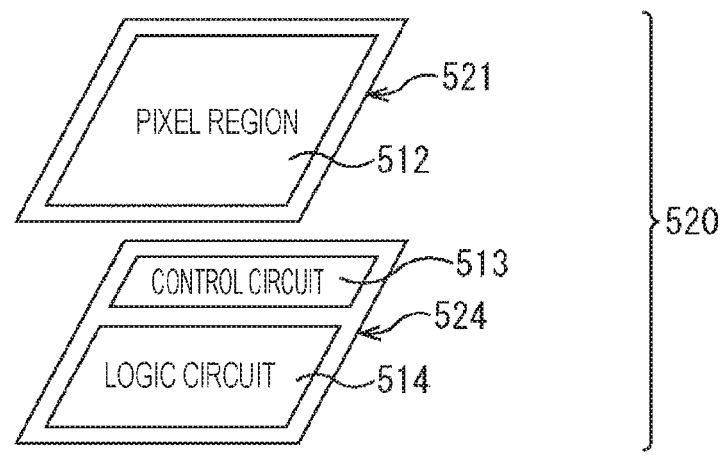

FIGS. 10A, 10B, and 10C is a are views illustrating outline of a configuration example of a laminated solid-state imaging device to which the technology according to the present disclosure can be applied.

FIG. 10A illustrates a schematic configuration example of a non-laminated solid-state imaging device. As illustrated in FIG. 10A, a solid-state imaging device 510 has one die (semiconductor substrate) 511. On this die 511, a pixel region 512 in which pixels are arranged in an array, a control circuit 513 which performs various kinds of control including driving of pixels, and a logic circuit 514 for performing signal processing are mounted.

The column unit 116, the gain setting unit 115, the digital processing unit 113 or the like according to the above-described embodiments can be mounted in the region in where the control circuit 513 and the logic circuit 514 are mounted.

FIGS. 10B and 10C illustrate a schematic configuration example of a laminated solid-state imaging device. As illustrated in FIGS. 10B and 10C, in the solid-state imaging device 520, two dies of a sensor die 521 and a logic die 524 are laminated and electrically connected to be constituted as one semiconductor chip.

In FIG. 10B, the pixel region 512 and the control circuit 513 are mounted on the sensor die 521, and the logic circuit 514 including a signal processing circuit which performs signal processing is mounted on the logic die 524.

In FIG. 10C, the pixel region 512 is mounted on the sensor die 521, and the control circuit 513 and the logic circuit 514 are mounted on the logic die 524.

<Application Example to Endoscopic Surgery System>

A technology (present technology) according to the present disclosure can be applied to various products. For example, the technology according to the present disclosure may be applied to an endoscopic surgery system.

Figure 11:
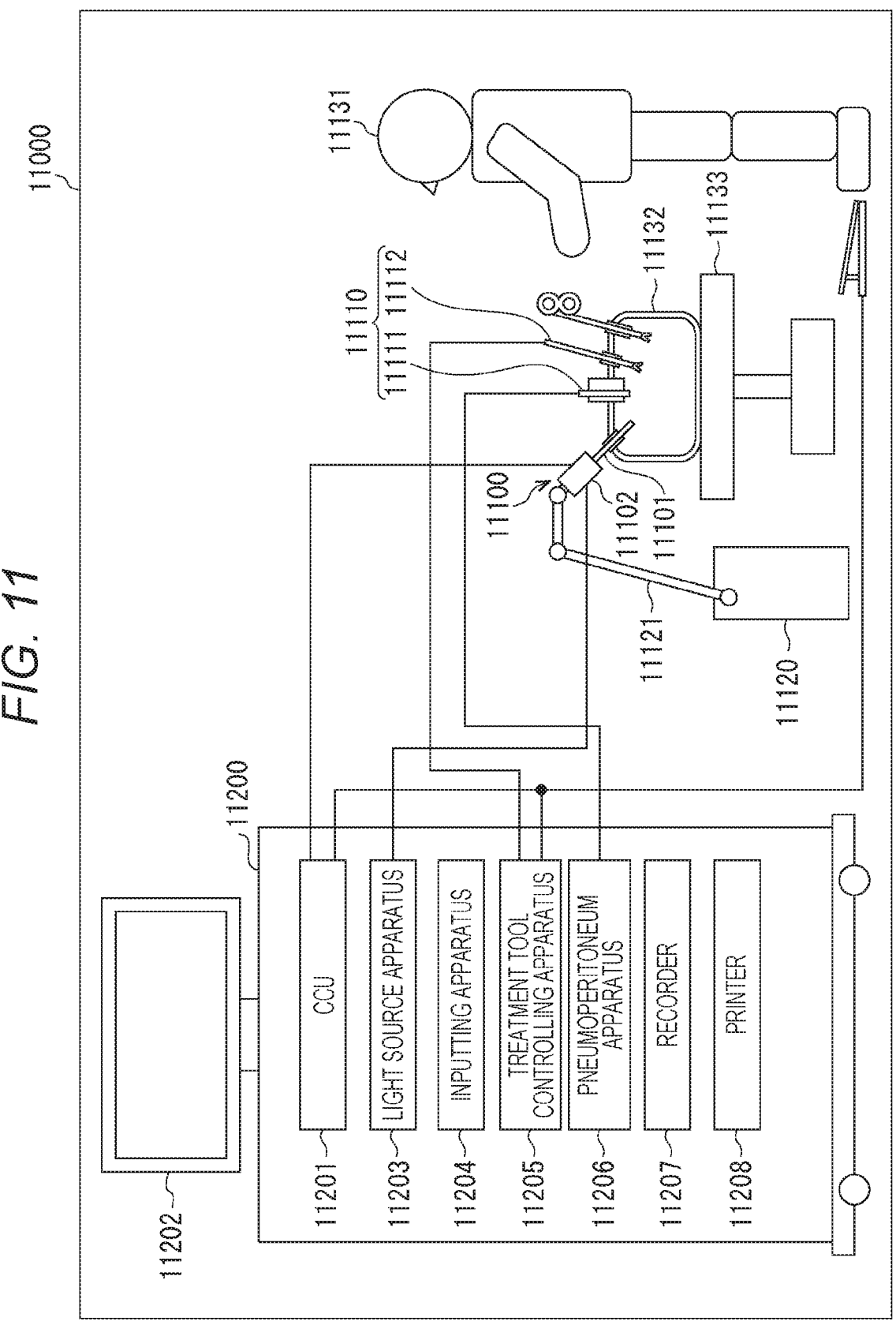
FIG. 11 is a view depicting an example of a schematic configuration of an endoscopic surgery system.

FIG. 11 is a view depicting an example of a schematic configuration of an endoscopic surgery system to which the technology according to the present disclosure (present technology) can be applied.

In FIG. 11, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which is included as a rigid endoscope having the lens barrel 11101 of the hard type. However, the endoscope 11100 may otherwise be included as a flexible endoscope having the lens barrel of the flexible type.

The lens barrel 11101 has, at a distal end thereof, an opening portion in which an objective lens is fitted. A light source apparatus 11203 is connected to the endoscope 11100 such that light generated by the light source apparatus 11203 is introduced to a distal end of the lens barrel by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup device are provided in the inside of the camera head 11102 such that reflected light (observation light) from the observation target is condensed on the image pickup device by the optical system. The observation light is photo-electrically converted by the image pickup device to generate an electric signal corresponding to the observation light, namely, an image signal corresponding to an observation image. The image signal is transmitted as RAW data to a camera control unit (CCU) 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region and the like to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or the like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup devices of the camera head 11102 are controlled in synchronism with the irradiation timings, it is also possible to time-divisionally capture images corresponding to respective R, G and B. According to the method just described, a color image can be obtained even if a color filter is not provided for the image pickup device.

Further, the light source apparatus 11203 may be controlled such that the intensity of light to be outputted is changed for each predetermined time. By controlling driving of the image pickup device of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), so-called narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue, for example. The light source apparatus 11203 can be configured to supply such narrow-band light and/or excitation light suitable for special light observation as described above.

Figure 12:
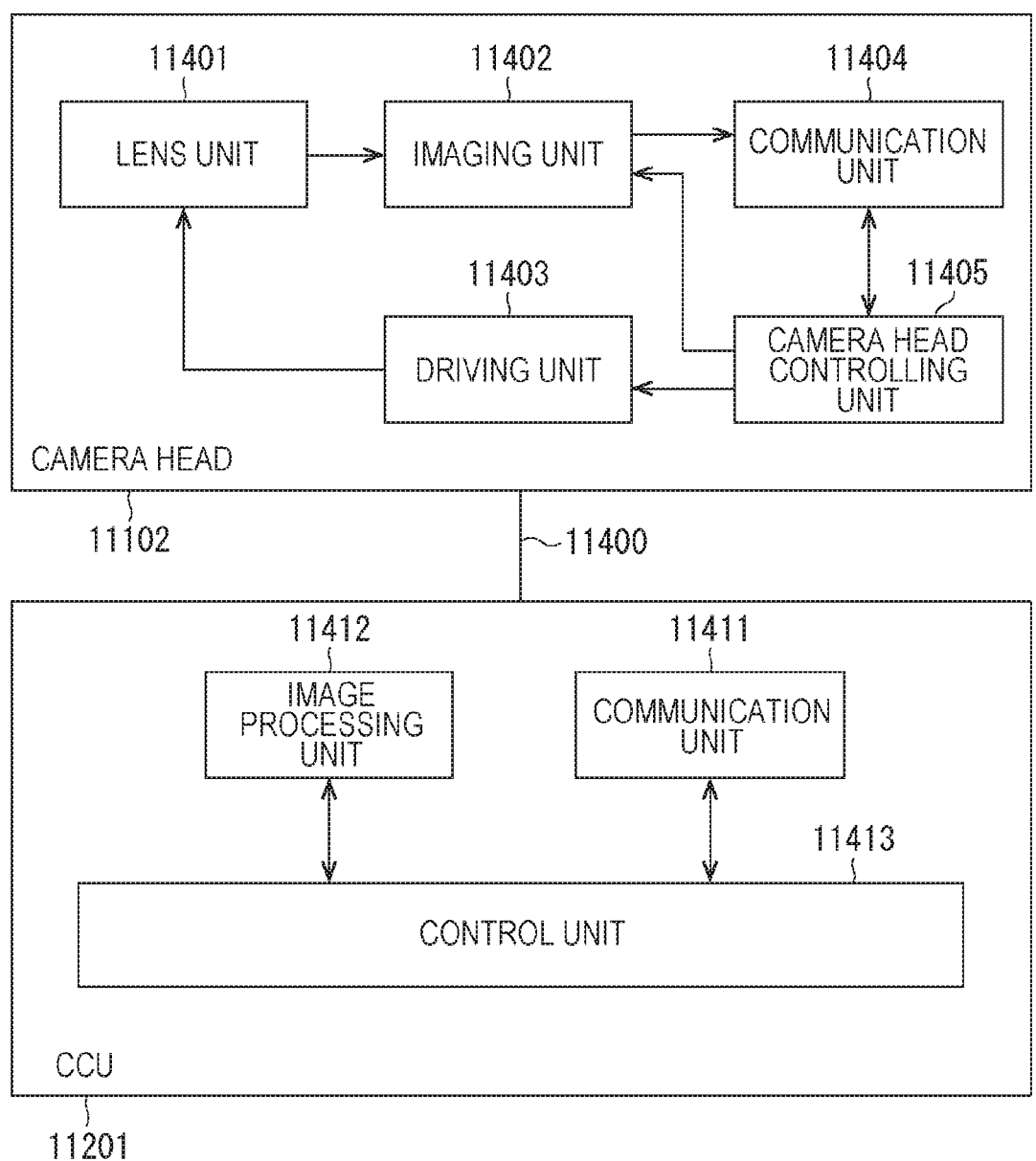
FIG. 12 is a block diagram depicting an example of a functional configuration of a camera head and a CCU.

FIG. 12 is a block diagram depicting an example of a functional configuration of the camera head 11102 and the CCU 11201 depicted in FIG. 11.

The camera head 11102 includes a lens unit 11401, an imaging unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup devices which is included by the imaging unit 11402 may be one (so-called single-plate type) or a plural number (so-called multi-plate type). Where the imaging unit 11402 is configured as that of the multi-plate type, for example, image signals corresponding to respective R, G and B are generated by the image pickup devices, and the image signals may be synthesized to obtain a color image. The imaging unit 11402 may also be configured so as to have a pair of image pickup devices for acquiring respective image signals for the right eye and the left eye ready for three dimensional (3D) display. If 3D display is performed, then the depth of a living body tissue in a surgical region can be comprehended more accurately by the surgeon 11131. It is to be noted that, in a case where the imaging unit 11402 is configured as that of multi-plate type, a plurality of systems of lens units 11401 is provided corresponding to the individual image pickup devices.

Further, the imaging unit 11402 may not necessarily be provided on the camera head 11102. For example, the imaging unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the imaging unit 11402 can be adjusted suitably.

The communication unit 11404 includes a communication apparatus for transmitting and receiving various kinds of information to and from the CCU 11201. The communication unit 11404 transmits an image signal acquired from the imaging unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to imaging conditions such as, for example, information by which a frame rate of a picked up image is designated, information by which an exposure value upon image picking up is designated and/or information by which a magnification and a focal point of a picked up image are designated.

It is to be noted that the image pickup conditions such as the frame rate, exposure value, magnification or focal point may be appropriately designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

<Application Example to Mobile Object>

A technology (present technology) according to the present disclosure can be applied to various products. For example, the technology according to the present disclosure may also be realized as a device mounted in a mobile object of any type such as automobile, electric vehicle, hybrid electric vehicle, motorcycle, bicycle, personal mobility, airplane, drone, ship, or robot.

Figure 13:
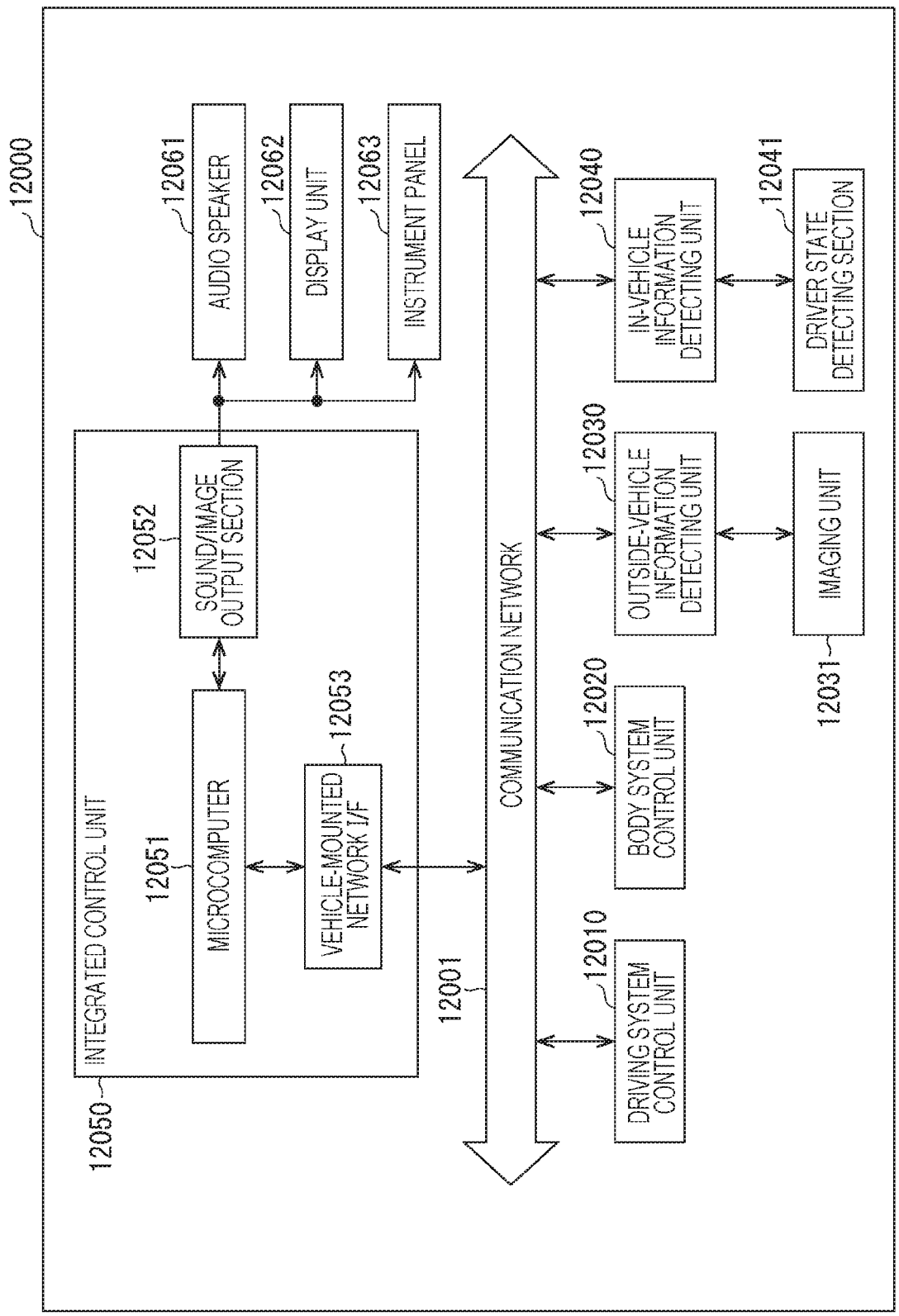
FIG. 13 is a block diagram depicting an example of schematic configuration of a vehicle control system.

FIG. 13 is a block diagram depicting an example of schematic configuration of a vehicle control system as an example of a mobile object control system to which the technology according to the present disclosure can be applied.

The vehicle control system 12000 includes a plurality of electronic control units connected to each other via a communication network 12001. In the example depicted in FIG. 13, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging unit 12031. The outside-vehicle information detecting unit 12030 makes the imaging unit 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging unit 12031 is an optical sensor that receives light, and which outputs an electric signal corresponding to a received light amount of the light. The imaging unit 12031 can output the electric signal as an image, or can output the electric signal as information about a measured distance. In addition, the light received by the imaging unit 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS)

which include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the surroundings of the vehicle which is obtained by the outside-vehicle information detecting unit 12030 or the in-vehicle information detecting unit 12040.

In addition, the microcomputer 12051 can output a control command to the body system control unit 12030 on the basis of the information about the outside of the vehicle which is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily notifying an occupant of the vehicle or the outside of the vehicle of information. In the example of FIG. 13, an audio speaker 12061, a display unit 12062, and an instrument panel 12063 are illustrated as the output device. The display unit 12062 may, for example, include at least one of an on-board display or a head-up display.

Figure 14:
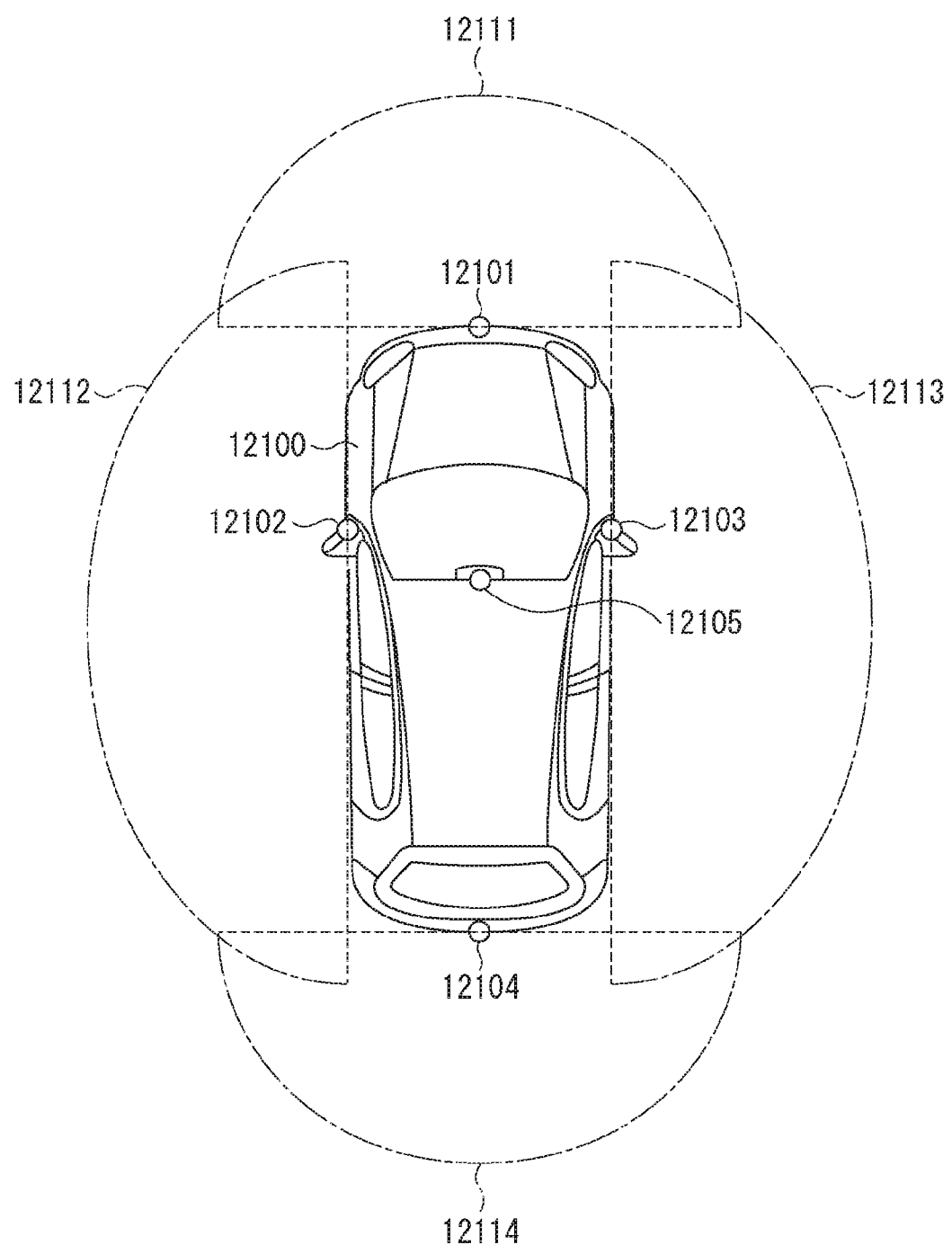
FIG. 14 is a diagram of assistance in explaining an example of installation positions of an outside-vehicle information detecting section and an imaging unit.

FIG. 14 is a diagram depicting an example of the installation position of the imaging unit 12031.

In FIG. 14, it includes imaging units 12101, 12102, 12103, 12104, and 12105 as the imaging unit 12031.

The imaging units 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle or the like. The imaging unit 12101 provided to the front nose and the imaging unit 12105 provided to the upper portion of the windshield within the interior of the vehicle obtain mainly an image of the front of the vehicle 12100. The imaging units 12102 and 12103 provided to the sideview mirrors obtain mainly an image of the sides of the vehicle 12100. The imaging unit 12104 provided to the rear bumper or the back door obtains mainly an image of the rear of the vehicle 12100. The imaging unit 12105 disposed on an upper portion of the windshield within the interior of the vehicle is used mainly to detect a preceding vehicle, a pedestrian, an obstacle, a signal, a traffic sign, a lane, or the like.

Incidentally, FIG. 14 depicts an example of imaging ranges of the imaging units 12101 to 12104. An imaging range 12111 represents the imaging range of the imaging unit 12101 provided to the front nose. Imaging ranges 12112 and 12113 respectively represent the imaging ranges of the imaging units 12102 and 12103 provided to the sideview mirrors. An imaging range 12114 represents the imaging range of the imaging unit 12104 provided to the rear bumper or the back door. A bird's-eye image of the vehicle 12100 as viewed from above is obtained by superimposing image data imaged by the imaging units 12101 to 12104, for example.

At least one of the imaging units 12101 to 12104 may have a function of obtaining distance information. For example, at least one of the imaging units 12101 to 12104 may be a stereo camera constituted of a plurality of image pickup devices, or may be an image pickup device having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging units 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole or the like, and other three-dimensional objects on the basis of the distance information obtained from the imaging units 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display unit 12062, and performs forced deceleration or avoidance steering via the driving system control unit 12010. The microcomputer 12051 can thereby assist in driving to avoid collision.

At least one of the imaging units 12101 to 12104 may be an infrared camera that detects infrared rays. The microcomputer 12051 can, for example, recognize a pedestrian by determining whether or not there is a pedestrian in imaged images of the imaging units 12101 to 12104. Such recognition of a pedestrian is, for example, performed by a procedure of extracting characteristic points in the imaged images of the imaging units 12101 to 12104 as infrared cameras and a procedure of determining whether or not it is the pedestrian by performing pattern matching processing on a series of characteristic points representing the contour of the object. If the microcomputer 12051 determines that there is a pedestrian in the imaged images of the imaging units 12101 to 12104, and thus recognizes the pedestrian, the sound/image output section 12052 controls the display unit 12062 so that a square contour line for emphasis is displayed so as to be superimposed on the recognized pedestrian. In addition, the sound/image output section 12052 may also control the display unit 12062 so that an icon or the like representing the pedestrian is displayed at a desired position.

Further, the advantageous effects described in the present specification are merely exemplary and are not limiting, and additional advantageous may be obtained.

Note that the embodiments of the present technology are not limited to the above-described embodiments, and various changes can be made within a scope not deviating from the gist of the present technology.

Additionally, the present technology may also be configured as below.

(1)

An image pickup device including:

a sample and hold unit configured to perform sampling and holding of a pixel signal;

an analog digital (AD) conversion unit configured to perform AD conversion of the pixel signal that includes a digit after a decimal point;

a digital gain processing unit configured to apply a predetermined gain to a digital signal from the AD conversion unit; and a gain setting unit configured to set an analog gain of a column unit including the sample and hold unit and the AD conversion unit.

(2)

The image pickup device according to (1), in which the gain setting unit sets the analog gain in accordance with a measured dark current amount.

(3)

The image pickup device according to (1) or (2), in which the gain setting unit sets the analog gain and the digital gain in such a manner that a value obtained by multiplying the analog gain by the digital gain becomes a constant value.

(4)

The image pickup device according to any one of (1) to (3), in which the column unit includes a variable resistance, and the gain setting unit sets a resistance value of the variable resistance at which a set analog gain is obtained.

(5)

The image pickup device according to (4), in which the variable resistance is provided between a first sample and hold unit configured to hold a pixel reset signal, and a second sample and hold unit configured to hold a pixel data signal.

(6)

The image pickup device according to any one of (1) to (5), in which the sample and hold unit includes a capacitor, and the gain setting unit sets a capacitance value of the capacitor at which a set analog gain is obtained.

(7)

The image pickup device according to any one of (1) to (6), further including a current source configured to flow a predetermined current to a signal line connected to the AD conversion unit, in which the gain setting unit sets a current value of the current source at which a set analog gain is obtained.

(8)

The image pickup device according to (7), in which, in a case where a current value of the current source is changed, the gain setting unit sets a current value of the AD conversion unit to a value corresponding to the current value of the current source.

(9)

An electronic device including:

an image pickup device; and a signal processing unit configured to process a signal output from the image pickup device, in which the image pickup device includes a sample and hold unit configured to perform sampling and holding of a pixel signal, an analog digital (AD) conversion unit configured to perform AD conversion of the pixel signal that includes a digit after a decimal point, a digital gain processing unit configured to apply a predetermined gain to a digital signal from the AD conversion unit, and a gain setting unit configured to set an analog gain of a column unit including the sample and hold unit and the AD conversion unit.

REFERENCE SIGNS LIST

10 Imaging device
11 Lens group
12 Image pickup device
13 DSP circuit
14 Frame memory
15 Display unit
16 Recording unit
17 Operation system
18 Power system
19 Bus line
20 CPU
22 Pixel array unit
50 Pixel
51 Pixel array unit
52 Row selection unit
53 Reading unit
54 Control line
55 Vertical signal line
72 Transfer transistor
74 Reset transistor
75 Amplification transistor
76 Selection transistor
111 S/H unit
112 Current source
113 Digital processing unit
114 Conversion and transmission unit
115 Gain setting unit
116 Column unit
131 Operational amplifier
141 Signal line
142 Current source
143 Transistor
144 Transistor
145 Resistance
151 Digital clamp unit
152 Digital gain processing unit
153 Processing unit

The invention claimed is:

1. An image pickup device, comprising:
a sample and hold circuitry configured to perform sampling and holding of a pixel signal;
an analog digital (AD) conversion circuitry configured to execute AD conversion of the pixel signal, wherein the pixel signal includes a digit after a decimal point;
a digital gain processing circuitry configured to apply a digital gain to a digital signal from the AD conversion circuitry; and
a gain setting circuitry configured to set an analog gain of a column circuitry, wherein the column circuitry includes the sample and hold circuitry and the AD conversion circuitry, and the analog gain and the digital gain are set in a manner that a value obtained by multiplying the analog gain by the digital gain becomes a constant value.

2. The image pickup device according to claim 1, wherein the gain setting circuitry is further configured to set the analog gain based on a measured dark current amount.

3. The image pickup device according to claim 1, wherein the column circuitry includes a variable resistance, and the gain setting circuitry is further configured to set a resistance value of the variable resistance at which the set analog gain is obtained.

4. The image pickup device according to claim 3, wherein the sample and hold circuitry includes:
   a first sample and hold circuitry configured to hold a pixel reset signal, and
   a second sample and hold circuitry configured to hold a pixel data signal; and
   the variable resistance is between the first sample and hold circuitry and the second sample and hold circuitry.

5. The image pickup device according to claim 1, wherein the sample and hold circuitry includes a capacitor, and the gain setting circuitry is further configured to set a capacitance value of the capacitor at which the set analog gain is obtained.

6. The image pickup device according to claim 1, further comprising a current source configured to flow a specific current to a signal line connected to the AD conversion circuitry, wherein the gain setting circuitry is further configured to set a current value of the current source at which the set analog gain is obtained.

7. The image pickup device according to claim 6, wherein based on a change in the current value of the current source, the gain setting circuitry is further configured to set a current value of the AD conversion circuitry to a value corresponding to the current value of the current source.

8. An electronic device, comprising:
   an image pickup device; and
   a signal processing circuitry configured to process a signal output from the image pickup device, wherein the image pickup device includes:
      a sample and hold circuitry configured to perform sampling and holding of a pixel signal,
      an analog digital (AD) conversion circuitry configured to execute AD conversion of the pixel signal, wherein the pixel signal includes a digit after a decimal point,
      a digital gain processing circuitry configured to apply a digital gain to a digital signal from the AD conversion circuitry, and
      a gain setting circuitry configured to set an analog gain of a column circuitry, wherein
         the column circuitry includes the sample and hold circuitry and the AD conversion circuitry, and
         the analog gain and the digital gain are set in a manner that a value obtained by multiplying the analog gain by the digital gain becomes a constant value.

* * * * *